Feb. 28, 1967   R. J. HANSEN ETAL   3,306,234
SECURING DEVICE
Filed May 14, 1964   2 Sheets-Sheet 1
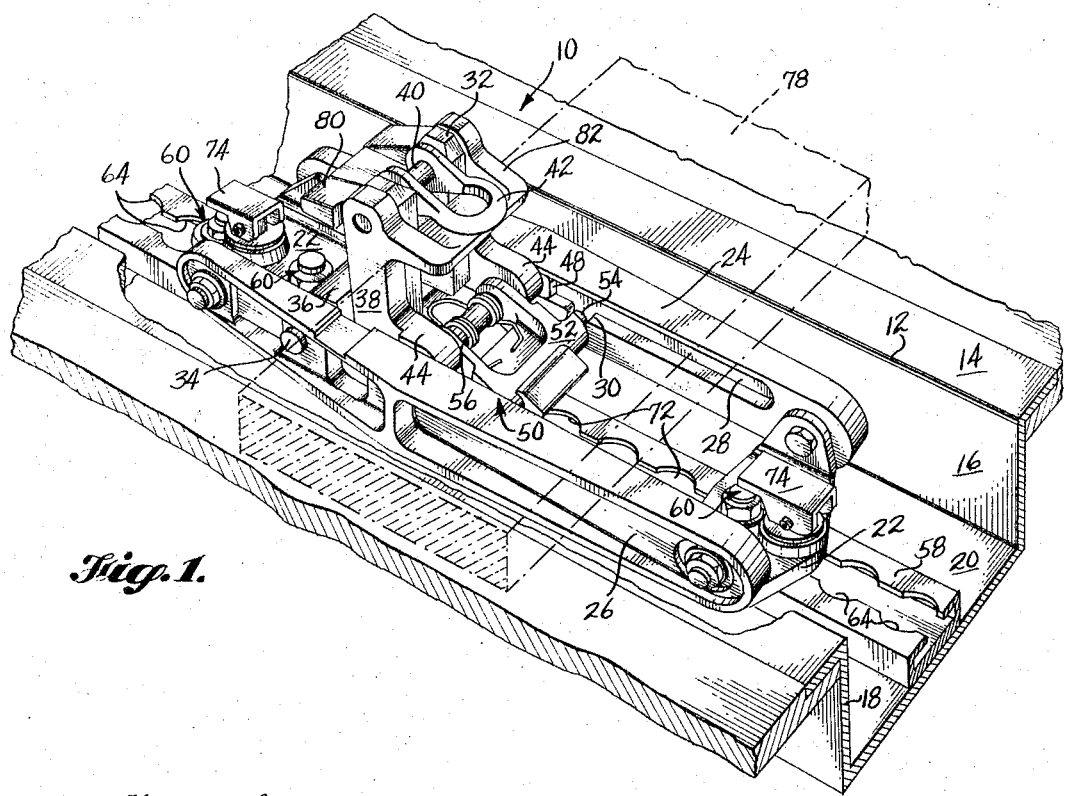
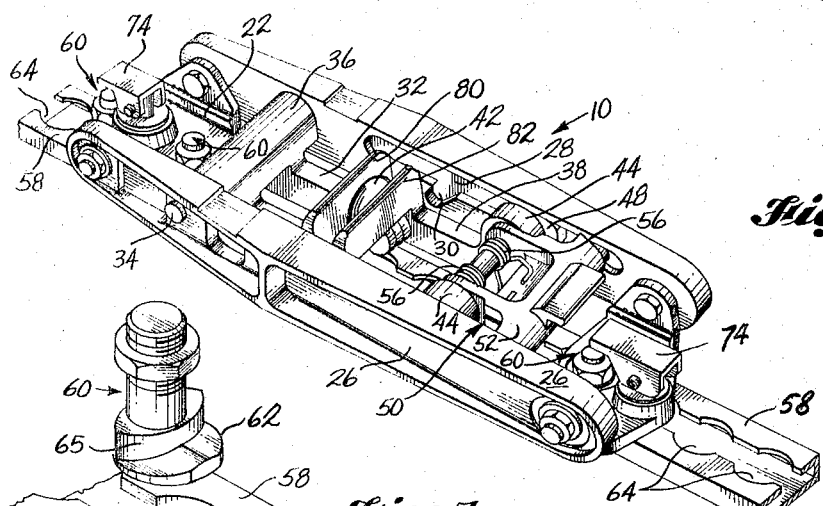
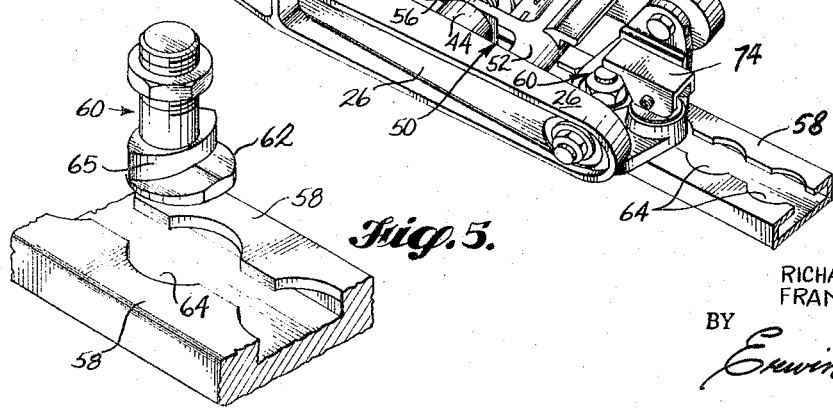
INVENTORS
RICHARD J. HANSEN
FRANCIS M. McDONOUGH
BY
*Erwin F. Adams*
ATTORNEY Feb. 28, 1967    R. J. HANSEN ETAL    3,306,234
SECURING DEVICE Filed May 14, 1964    2 Sheets-Sheet 2

INVENTORS
RICHARD J. HANSEN
FRANCIS M. McDONOUGH
BY

ATTORNEY

United States Patent Office 3,306,234
Patented Feb. 28, 1967

3,306,234
SECURING DEVICE
Richard J. Hansen, Seattle, and Francis M. McDonough, Bellevue, Wash., assignors to The Boeing Company, Seattle, Wash., a corporation of Delaware
Filed May 14, 1964, Ser. No. 367,514
7 Claims. (Cl. 105—369)

This invention relates to securing devices and more particularly to securing devices for use in a floor recess which in its operative position can be used to restrain cargo loads.

The present invention was conceived to improve cargo handling apparatus in aircraft, but obviously is usable in all types of commercial vehicles. Early attempts to solve securing or tie-down problems have involved the use of devices which were permanently mounted to the floor of the vehicle to carry the cargo. The obvious deficiency with the "fixed" hardware approach was interference between the "fixed" securing device and cargo during cargo transistion on the cargo floor. This problem was solved by devices which could be folded into a recess in the floor and erected to an upright position at which time the cargo could be tied to the projecting device. Many of these devices, however, were heavy, complex to operate, structurally inadequate and generally undesirable. Moreover, placing these devices in fixed recesses in the floor often resulted in inadequate positioning of the devices relative to the load which was desired to be secured so as to make tie-down cumbersome. It was therefore suggested in the prior art that these devices be located in troughs or trays located in the vehicle floor which allowed longitudinal positioning of the device relative to the load to be secured. While this system offered further increase in freedom of positioning, it resulted in securing devices which were even more complex in terms of their mounting to the vehicle floor and their erection to an operative position.

Accordingly, it is an object of the present invention to provide a securing device which can be completely confined within a floor recess in its inoperative position and may be easily erected to its operative position.

It is another object of the present invention to provide a securing device which may be used in a trough or tray-like recess in a floor and may be unlocked and relocated advantageously relative to the cargo load to be secured without the use of any tools.

It is still another object of the present invention to provide a securing device which may be located on a cargo floor in a field of roller trays and which is below the surface of the rollers when retracted allowing uninterrupted transition of the cargo.

It is yet another object of the present invention to provide a securing device which may be relocated along the length of a floor tray and fixed at various positions along this length without the use of tools.

Further objects and advantages of the present invention will become apparent from the following description taken in conjunction with the accompanying drawings in which:

FIGURE 1 is a perspective view of a securing device in accordance with the present invention, shown in the erected operative position;

FIGURE 2 is a perspective view of a securing device in accordance with the present invention, shown in its inoperative retracted position;

FIGURE 5 is a perspective view of an L-shaped mounting member.

Figure 3:
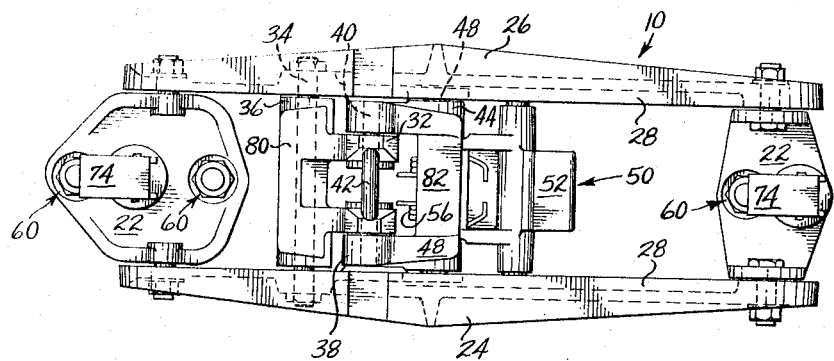
FIGURE 3 is a plan view of a securing device in accordance with the present invention, shown in the operative erected position.

Generally, a securing device is provided for use in a floor recess having opposed walls comprising a first member pivotally supported at one end in said walls, a second member pivotally connected at one end to the other end of the first member, and means for locking the first and second members in an operative upright position pivotally supported by the second member and adapted to coact with slots and detents formed in the opposed walls.

Referring to FIGURE 1, a securing device 10 is shown in its operative position disposed within a tray 12 in a floor 14. The tray 12 extends longitudinally in floor 14 and has opposed walls 16 and 18 and a floor 20. The securing device 10 has a pair of members which comprise a base member 22. Attached to base 22 are two side plates 24 and 26 which extend essentially parallel to the walls 16 and 18 of the tray 12. The side plates 24 and 26 have longitudinally extending slots or tracks 28 disposed in the inner surface of the side plates. Near one end of the slot 28 a detent 30 is formed in the lower portion of the slot.

A first member 32 is pivotally supported between side plates 24 and 26 on a shaft or pin 34. The shaft 34 passes through a projection 36 which is offset from the plane of member 32, so that in its inoperative position member 32 will not project above the top of plates 24 and 26. A second member 38 is pivotally connected through a pin 40 to the free end of the first member 32. A locking ring 42 is also pivotally mounted on pin 40 to provide a loop or ring for securing tie-down straps. At the other end of second member 38 two ears 44 are provided which extend in a direction opposite to the projection 36 on member 32. A shaft 46 extends between the two ears 44 and passes through the thickness of the ears so as to extend beyond the outer surface of the ears 44. A pair of shoes 48 are mounted on the outer extensions of shaft 46 and adapted to coact with longitudinally extending slots 28. Also mounted on shaft 46 is locking means 50 which comprises a member 52 pivotally mounted to shaft 46 at one end and a pair of transversely projecting lugs 54 mounted on the free end of member 52. Also mounted on shaft 46 is a torsional resilient means or spring 56 having one end in contact with locking member 52 and the other end in contact with second member 38. Spring 56 urges the lugs 54 on member 52 into the detents 30 of the longitudinally-extending slots 28.

A mounting means for the securing device 10 is provided which prevents upward movement of device 10 out of the tray 12 while allowing limited longitudinal movement of the device along the tray during installation. This mounting means includes an inverted T-shape longitudinally extending track-slot 58 mounted on the floor 20 of the tray 12. Slideably cooperating with the inverted T-shape track 58 are two L-shape pins 60 mounted on opposite ends of securing device base member 22. These pins project below the lower surface of base members 22 so that one leg of the pins will engage the slot in member 58.

The L-shaped pin 60, shown in FIGURE 5, has a circular base leg 62 which may be placed in a hole 64 in track-slot 58. A shoulder 65 on the upright leg of the pin 60 prevents the pin from longitudinal sliding out of hole 64 but allows the pin to be slideably positioned within the hole. With the forward part of the shoulder 65 in contact with the walls of hole 64, the pin is prevented from upward movement thus restraining the device in the floor tray.

A means for selectively preventing longitudinal movement of the securing device 10 in the tray 12 is also mounted on the device and shown generally by numeral 68. The assembly 68 comprises a vertically oriented piston 70 which is resiliently biased in a downward direction by spring 72 and may be drawn in an upward direction by handle 74 which is pivotally mounted through pin 76 to piston 70. Handle 74 has a cam surface which allows the handle to be sustained in an upward position overcoming the bias of spring 66. The assembly 68 is adapted to coact with series of holes 64 which are distributed along the length of the longitudinally-extending track-slot member 58. The head of piston 70 is adapted to closely fit in the hole 64. The assembly 68 for selectively preventing longitudinal movement of the securing device is located one to each end of the securing device 10.

It should be pointed out that the present invention is readily adaptable for use in securing heavily-loaded pallets which are often used to facilitate the loading of cargo in commercial vehicles. A pallet such as 78, shown in FIGURE 1, is secured by providing the first and second members 32 and 38 with locking dogs 80 and 82, respectively. The locking dogs 80 and 82 project at right angles to the members 32 and 38 and are parallel to the floor 14 of the vehicle when members 32 and 38 are in the operative position. The pallet 78 may be moved in abutting relationship to member 38 and beneath the locking dog 82 so as to be secured from upward as well as longitudinal movement. In this manner, a pallet may be prevented from sliding movement within the vehicle due to emergency stops or other acceleration forces to which the load on the pallet is subjected.

In operation, the securing device 10 may be erected from its inoperative position, as shown in FIGURE 2, wherein no members of the securing device project above the top of side plates 24 and 26 (and therefore the floor 14), to its operative position as shown in FIGURE 1. The securing device 10 may be inserted into tray 12 at its desired location by lifting the handles 74 of assembly 68 so that piston 70 overcomes the bias of spring 72 thereby withdrawing within the base member 22 so as not to engage hole 64 in the track-slot 58. The forward portion of shoulders 65 of pins 60 are then slid in contact with the walls of holes 64 so that piston 70 is positioned above the adjacent hole and the base leg 62 projects beneath the portion of track-slot 58 between the holes so as to prevent upward movement of the pins relative to track-slot 58. When finally positioned in its proper position relative to a palletized load, the handle 74 is depressed so piston 70 projects into the holes 64 and thereby prevents the securing device 10 from longitudinal movement within the tray 12. Having positioned the securing device 10, it may be erected to its operative position. The members 32 and 38 are pulled to an upright position by lifting underneath the locking dog 82 with one hand and concurrently pushing the members 32 and 38 in a directions the base of the member 32. This will cause a sliding movement of shoes 48 in the slot 28 and simultaneously overcomes the resistance of torsional spring 56. Spring 56 urges the free end of member 52 in a downward direction so that the lugs 54 mounted on member 52 will engage detents 30 formed in the lower portion of the slot 28. Engagement of lugs 54 in the detents 30 prevents the shoes 48 from sliding in the slot 28 thereby locking the members 32 and 38 in an upright operative position. At this time a pallet, such as 78, may be positioned in abutting relationship on either side of the upright members 32 and 38 and is prevented from movement in upward and longitudinal direction. Tie-down straps may then be secured to locking ring 42. The securing device 10 may be returned to its inoperative position by manually lifting the free end of member 52 so as to overcome the bias of spring 56 and thereby disengaging the lugs 54 from the detents 30. The shoes 48 are then free to slide in the slot 28 which allows the members 32 and 38 to move to their inoperative position below the level of floor 14.

Since the securing device is entirely confined within the tray 12 when in its inoperative position, palletized loads may be readily slid across the floor 14 and positioned at various locations on the floor. Sliding of the palletized loads may be facilitated by rollers or other members inserted in floor 14 which reduces the frictional resistance between the load and the floor. While these roller members form no part of the present invention, they are oftentimes employed in cargo handling systems and their use with the present invention makes them even more useful.

Figure 4:
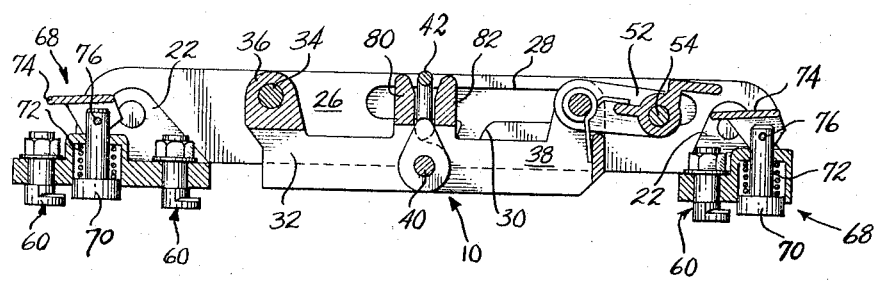
FIGURE 4 is a cross-sectional side elevation view of a securing device in accordance with the present invention, shown in the inoperative retracted position.

The securing device 10 as shown in FIGURES 1 through 4 illustrates a preferable embodiment of the present invention. However, it should be realized that the retractable feature of the present invention could also be advantageously utilized in a fixed location. In other words, if longitudinal positioning of the securing device is not required, the device may be fixed in a small cavity located in a floor. When so used, the opposed walls of the cavity may be substituted for the side plates of the above-described device, and the slots which allow the members 32 and 38 to be retracted and extended may be disposed within the opposed walls. Retraction and extension of the members 32 and 38 would be performed in substantially the same manner as above described.

While there has been shown and described the fundamental and novel features of this invention as applied to the preferred embodiment, it will be understood that various omissions and substitutions and changes in the form and details of the device illustrated may be made by those skilled in the art without departing from the spirit of the invention. It is the intention, therefore, to be limited only by the scope of the following claims and reasonable equivalents thereof.

We claim:
1. A movable securing device for use in a longitudinally extending floor tray having a floor and opposed walls and slidable mounting means including an inverted T-shape longitudinally extending track-slot in said floor comprising:
  (a) a movable frame including
    (1) a base, and
    (2) two side plates fixed to said base and upstanding therefrom, each side plate having a longitudinally extending slot with at least one detent in said slot;
  (b) a first member having a first end and a second end, and being pivotally supported at its first end between said side plates;
  (c) a second member having a first end and a second end, and being pivotally connected to the second end of said first member, said second member having at its first end a pair of ears with pivotally mounted shoes slidably mounted in said longitudinally extending slots, said ears supporting a transverse shaft therebetween;
  (d) a locking member pivotally connected at one end to said shaft and having lugs transversely projecting from its other end adapted to fit in locking engagement with said detents in said slots;
  (e) L-shaped pins mounted on said base and projecting downwardly, said pins adapted to slidably engage the longitudinally extending inverted T-shaped track-slot to prevent upward movement of said securing device out of said tray;
  (f) means mounted on said base for selectively preventing longitudinal movement of said securing device relative to said tray;
  (g) securing means mounted on at least one of said first and second members, whereby said securing means is moved to a securing position by moving said first and second member to an erected position.

2. The securing device of claim 1 additionally comprising torsional resilient means biasing said locking member relative to said second member so as to urge said locking member lugs into said detents.

3. A securing device for use in a floor cavity having opposed walls comprising:

(a) a first member having a first end and a second end and being pivotally supported by its first end in said walls;
(b) a second member having a first end and a second end and being pivotally connected at its second end to the second end of said first member, said second member having at its first end laterally extending ears with pivotally mounted shoes slidably mounted in longitudinally extending tracks disposed within the opposed walls;
(c) means pivotally mounted to the first end of said second member for locking said first and second members in an upright position;
(d) securing means mounted to at least one of said first and second members whereby said securing means is moved to a securing position by moving said first and second member to an erected position.

4. The securing device of claim 3 wherein said locking means comprises a locking member pivotally mounted at one end between said ears and having locking lugs mounted on its other end to fit in locking engagement with detents in slots disposed within the opposed walls.

5. The securing device of claim 4 additionally comprising torsional resilient means biasing said locking member relative to said second member so as to urge said locking member lugs into said detents.

6. A securing device comprising:
(a) a base member adapted to be mounted in a recess of a floor;
(b) a first securing member having a first end by which it is pivotally secured to said base member, and having a second end which can be swung upwardly from a first retracted position to a second cargo engaging position upstanding from said base frame;
(c) a second securing member having a second end which is pivotally secured to the second end of the first securing member so as to be movable therewith to an upstanding cargo engaging position, and having a first end which is slidably secured to said base member so as to be movable longitudinally along said base member;
(d) securing means to secure cargo mounted to at least one of said first and second members;
(e) a locking member connected to the first end of said second member and having locking means thereon to engage said base member so as to prevent slide motion of said second member and thus hold said first and second member in its upstanding cargo carrying position;
(f) said base member having two side plates with longitudinal slots, the first end of said second securing member having slot engaging means slidably mounted in said slots, said locking member having transversely extending lugs to fit in locking engagement with detents formed in said slots so as to hold said securing members in their upstanding position.

7. The securing device as recited in claim 6, wherein said second member has a pair of laterally extending shoes pivotally mounted to the first end of said second member, each of said shoes fitting into a related one of said slots so as to be slidable therein.

References Cited by the Examiner

UNITED STATES PATENTS

| | | | |
|---|---|---|---|
| 2,351,314 | 6/1944 | Ario | 296—35 |
| 2,439,423 | 4/1948 | Fowler | 244—118 |
| 3,188,042 | 6/1965 | Watters | 248—361 |
| 3,204,581 | 9/1965 | Davidson | 105—369 |
| 3,210,038 | 10/1965 | Bader et al. | 105—369 X |
| 3,212,457 | 10/1965 | Looker | 105—369 |

ARTHUR L. LA POINT, *Primary Examiner.*

DRAYTON E. HOFFMAN, *Examiner.*